(12) United States Patent
Cho et al.

(10) Patent No.: US 10,673,072 B2
(45) Date of Patent: Jun. 2, 2020

(54) SILICON ANODE ACTIVE MATERIAL AND PREPARATION METHOD THEREFOR

(71) Applicant: Nexeon Ltd., Oxfordshire (GB)

(72) Inventors: Young Tai Cho, Seoul (KR); Yong Gil Choi, Daejeon (KR); Seon Park, Daejeon (KR); Young Jae Lee, Daejeon (KR); Hee Young Seo, Daejeon (KR); Jee Hye Park, Daejeon (KR); Yong Eui Lee, Gyeonggi-do (KR); Young Jin Hong, Daejeon (KR)

(73) Assignee: Nexeon Ltd., Oxfordshire (GB)

( * ) Notice: Subject to any disclaimer, the term of this patent is extended or adjusted under 35 U.S.C. 154(b) by 101 days.

(21) Appl. No.: 15/553,294

(22) PCT Filed: Feb. 24, 2015

(86) PCT No.: PCT/KR2015/001780
§ 371 (c)(1),
(2) Date: Aug. 24, 2017

(87) PCT Pub. No.: WO2016/137024
PCT Pub. Date: Sep. 1, 2016

(65) Prior Publication Data
US 2018/0034056 A1     Feb. 1, 2018

(51) Int. Cl.
*H01M 4/587*     (2010.01)
*H01M 4/62*      (2006.01)
(Continued)

(52) U.S. Cl.
CPC ........... *H01M 4/587* (2013.01); *C01B 32/956* (2017.08); *H01M 4/38* (2013.01); *H01M 4/386* (2013.01);
(Continued)

(58) Field of Classification Search
None
See application file for complete search history.

(56) References Cited

U.S. PATENT DOCUMENTS 7,615,206 B2   11/2009   Sandhage et al.
9,859,552 B2    1/2018   Fukasawa et al.
(Continued)

FOREIGN PATENT DOCUMENTS

JP    2008-004460    1/2008
JP    2012-178269    9/2012
(Continued)

OTHER PUBLICATIONS

JP-2012178269-A English machine translation (Year: 2012).*
(Continued)

*Primary Examiner* — Scott J. Chmielecki
(74) *Attorney, Agent, or Firm* — William R. Haulbrook; Michael D. Schmitt; Choate, Hall & Stewart LLP

(57) ABSTRACT

The present invention relates to a silicon anode active material capable of high capacity and high output, and a method for fabricating the same. A silicon anode active material according to an embodiment of the present invention includes a silicon core including silicon particles; and a double clamping layer having a silicon carbide layer on the silicon core and a silicon oxide layer between the silicon core and the silicon carbide layer.

24 Claims, 8 Drawing Sheets

(51) Int. Cl.
   *H01M 4/38*   (2006.01)
   *C01B 32/956*   (2017.01)
   *H01M 4/88*   (2006.01)
   *H01M 4/02*   (2006.01)

(52) U.S. Cl.
   CPC .......... *H01M 4/62* (2013.01); *H01M 4/8885* (2013.01); *H01M 4/622* (2013.01); *H01M 2004/027* (2013.01)

(56) References Cited

U.S. PATENT DOCUMENTS

| | | | |
|---|---|---|---|
| 10,164,257 | B2 | 12/2018 | Otsuka et al. |
| 2002/0121460 | A1 | 9/2002 | Moy et al. |
| 2005/0031958 | A1* | 2/2005 | Fukuoka ............... H01M 4/386 429/218.1 |
| 2008/0261112 | A1 | 10/2008 | Nagata et al. |
| 2009/0239151 | A1 | 9/2009 | Nakanishi et al. |
| 2010/0209328 | A1 | 8/2010 | Bi et al. |
| 2011/0001097 | A1* | 1/2011 | Aramata ............... H01M 4/13 252/521.3 |
| 2013/0071750 | A1* | 3/2013 | Park .................... H01M 10/052 429/231.8 |
| 2013/0115517 | A1 | 5/2013 | Kim et al. |
| 2014/0302396 | A1 | 10/2014 | Lu et al. |
| 2015/0086870 | A1* | 3/2015 | Fukasawa ............. H01M 4/136 429/218.1 |
| 2015/0325848 | A1* | 11/2015 | Yamashita ............ H01M 4/386 429/231.4 |
| 2017/0047580 | A1 | 2/2017 | Cho et al. |
| 2017/0352883 | A1 | 12/2017 | Cho et al. |
| 2018/0083263 | A1 | 3/2018 | Cho et al. |

FOREIGN PATENT DOCUMENTS

| | | |
|---|---|---|
| JP | 2012178269 A * | 9/2012 |
| KR | 10-1204192 | 11/2012 |
| KR | 10-2013-0031778 | 3/2013 |
| KR | 10-2013-0050704 | 5/2013 |
| WO | WO-2016/174023 A1 | 11/2016 |

OTHER PUBLICATIONS

International Search Report dated Sep. 21, 2015 for PCT/KR2015/001780.

Su, L. et al., Core Double-shell Si@SiO$_2$@C nanocomposites as anode materials for Li-ion batteries, Chemical Communication, 46:2590-2592 (2010).

Yang, J. et al., Si/c composites for high capacity lithium storage materials, Journal of the Electrochemical Society, 6(8):154-156 (2003).

* cited by examiner

SILICON ANODE ACTIVE MATERIAL AND PREPARATION METHOD THEREFOR

This application is the National Stage application of International Application No. PCT/KR2015/001780, filed Feb. 24, 2015, which designates the United States and was published in Korean. The International Application No. PCT/KR2015/001780 is hereby incorporated by reference in its entirety into the present application.

TECHNICAL FIELD

The present invention relates to secondary battery technology, and more particularly, to a silicon anode active material and a method of fabricating the same.

BACKGROUND ART

Recently, demand for secondary batteries such as lithium batteries, lithium ion batteries, and lithium ion polymer batteries is greatly increasing. The secondary battery is a rechargeable battery using an electrode material having excellent reversibility and the secondary battery may be a nickel-hydrogen (Ni-MH) battery, a lithium battery or a lithium ion battery depending on the anode and the cathode active material. Such secondary batteries are increasingly widely being applied to various applications as power supply sources for information technology (IT) devices such as smart phones, portable computers, and electronic paper, or for transportation systems such as electric vehicles.

A carbon-based material having a theoretical capacity of 372 mAh/g is generally applied as a material capable of inhibiting dendrites of lithium in a lithium battery from growing. However, as the application of the secondary battery has expanded, there has been a demand for higher capacity and higher output of the secondary battery than before. Accordingly, a non-carbon anode material capable of being alloyed with lithium such as silicon (Si), tin (Sn), or aluminum (Al) having a capacity of 500 mAh/g or more to replace the theoretical capacity of the carbon-based anode materials have greatly drawn attention.

Among the non-carbon-based anode materials, the silicon has the theoretical capacity of about 4,200 mAh/g, which is the largest. However, since the volume of the silicon anode material expands by about 4 times during charging of the silicon anode material, due to the volume change during charging and discharging, the electrical connection between the active materials may be broken, the active material may be separated from a current collector, and the active material may be eroded by electrolyte, which are a barrier to its practical use. Therefore, for the application of the silicon material to the anode material, it is required to improve the irreversibility of the battery due to the volume change during charging and discharging of the battery. In addition, with explosive growth of demand for secondary batteries, it is necessary to secure fabrication technology that can economically and mass-produce silicon anode active materials.

DISCLOSURE OF THE INVENTION

Technical Problem

Accordingly, a technical problem to be solved by the present invention is to provide an anode active material having a high energy density and a long life by alleviating the volume change due to charging and discharging of a battery while having high capacity and high output by using silicone as the anode active material.

Other technical problem to be solved by the present invention is to provide a method of fabricating the anode active material which may economically and rapidly mass-produce a silicon anode active material having the above-described advantages.

Technical Solution

According to an aspect of the present invention, there is provided a silicon anode active material comprising: a silicon core including silicon particles; And a double clamping layer having a silicon carbide layer on the silicon core and a silicon oxide layer between the silicon core and the silicon carbide layer. The silicon oxide layer may be a silicon source of the silicon carbide layer.

In one embodiment, the thickness of the double clamping layer is 0.5 nm to 20 nm, and the ratio of the thickness of the double clamping layer to the radius of the silicon core is in the range of 1% to 10%.

In some embodiments, the silicon anode active material may further comprise a conductive layer formed on the double clamping layer. In addition, the double clamping layer may include through holes, and the conductive layer may be continuously coated on the silicon anode active material through the through holes. The conductive layer may include a carbon-based conductive layer.

According to another aspect of the present invention, there is provided a method of manufacturing a silicon anode active material, comprising: forming a silicon core and a first intermediate particle having a silicon oxide layer on the silicon core. Thereafter, a first solid organic layer is coated on the first intermediate particles to form second intermediate particles; then the second intermediate particles are heat-treated at a first temperature to convert the first solid organic layer into a carbon layer to form third intermediate particles. Subsequently, the third intermediate particles are heat-treated at a second temperature to form a silicon carbide layer between the silicon oxide layer and the carbon layer to form a double clamping layer including the silicon oxide layer and the silicon carbide layer can do.

The silicon oxide layer becomes the silicon source of the silicon carbide layer. The first temperature for forming the carbon layer is in the range of 700° C. to 1,100° C. The second temperature for forming the silicon carbide layer may be in the range of 1,150° C. to 1,300° C.

The thickness of the silicon oxide layer of the first intermediate particles may be in the range of 1% to 10% of the radius of the silicon core. In some embodiments, the thickness of the silicon oxide layer of the third intermediate particles may range from 1 to 10 times the thickness of the carbon layer. Further, the thickness of the double clamping layer may be 0.5 nm to 20 nm, and the ratio of the thickness of the double clamping layer to the radius of the silicon core may be in the range of 1% to 10%.

The forming of the second intermediate particles may include: preparing a dispersion solution containing a carbon precursor; dispersing the first intermediate particles in the dispersion solution; and a step of obtaining the first intermediate particles with the dispersed solution wetted and drying. In one embodiment, the carbon precursor may be one solution selected from the group consisting of hydrocarbon-based, alcohol-based, ether-based, and ester-based compounds, or two or more mixed solutions; or the carbon-containing natural high-molecular substance and the carbon-containing synthetic polymer substance dissolved in the solution or water, or a mixture thereof. The carbon-containing polymer material may include the group consisting of chitosan, glucose, sucrose, maltose, lactose, starch, glycogen, polystyrene (PS), polypropylene (PP), polyvinyl chloride (PVC), polyacrylonitrile (PAN), polyethylene (PE), polyacrylic acid (PAA), polyvinylpyrrolidone (PVP).

According to another aspect of the present invention, there is provided a method of manufacturing a silicon anode active material, comprising: forming a first intermediate particle having a silicon core and a silicon oxide layer on the silicon core; A first solid organic layer is coated on the first solid organic layer to form second intermediate particles. Thereafter, the second intermediate particles are heat-treated to convert the first solid organic layer into a carbon layer, and a silicon carbide layer is formed between the silicon oxide layer and the first solid organic layer to form the silicon oxide layer and the silicon carbide layer to form a double clamping layer.

The silicon oxide layer may be a silicon source of the silicon carbide layer. The heat treatment temperature may be in the range of 1,150° C. to 1,300° C.

The thickness of the silicon oxide layer of the first intermediate particles may be in the range of 1% to 10% of the radius of the silicon core. The thickness of the double clamping layer is 0.5 nm to 20 nm and the ratio of the thickness of the double clamping layer to the radius of the silicon core is in the range of 1% to 10%.

The forming of the second intermediate particles may include: preparing a dispersion solution containing a carbon precursor; dispersing the first intermediate particles in the dispersion solution; and a step of obtaining the first intermediate particles with the dispersed solution wetted and drying.

In one embodiment, the carbon precursor may be one solution selected from the group consisting of hydrocarbon-based, alcohol-based, ether-based, and ester-based compounds, or two or more mixed solutions; or the carbon-containing natural high-molecular substance and the carbon-containing synthetic polymer substance dissolved in the solution or water, or a mixture thereof. The carbon-containing polymeric material may include chitosan, (PE), polypropylene (PP), polyvinyl chloride (PVC), polyacrylonitrile (PAN), polyethylene (PE), poly (ethylene terephthalate), polyvinylpyrrolidone Acrylic acid (PAA), Polyvinylpyrrolidone (PVP), or a mixture thereof.

Advantageous Effects

According to an embodiment of the present invention, there is provided a silicon anode material which has a silicon core including pure silicon particles for securing a high capacity, and a double clamping layer having a silicon oxide layer and a silicon carbide layer on the silicon core. The double clamping layer may suppress volume change during the charging and discharging of the batteries, resulting in a silicon anode active material which realizes a cathode having an improved life span. In addition, when the double clamping layer has a through hole through which the silicon core is exposed, ions such as lithium ions can freely pass between the silicon core and outside of the silicon anode material, thereby enabling charge and discharge of the battery with high efficiency and high output.

Further, according to the embodiment of the present invention, since the silicon oxide layer formed on the silicon core is used as the silicon source to form the silicon carbide layer, there is an advantage that the double clamping layer can be stably formed without erosion of the silicon core. In addition, by using a liquid carbon precursor to produce the silicon carbide layer, optimal dispersion of the intermediate particles to be formed with the double clamping layer and uniform wetting of the solid organic layer are induced, and a dense carbon layer and a silicon carbide layer can be economically and rapidly formed in a large amount.

MODE FOR CARRYING OUT THE INVENTION

Figure 1A:
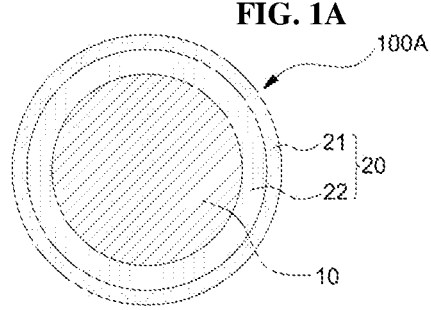
FIGS. 1A and 1B are cross-sectional views illustrating silicon anode active materials according to an embodiment of the present invention, respectively.

Hereinafter, preferred embodiments of the present invention will be described in detail with reference to the accompanying drawings.

While the present invention has been particularly shown and described with reference to exemplary embodiments thereof, it is evident that many alternatives, modifications and variations will be apparent to those skilled in the art. But the present invention is not limited to these examples. Rather, these embodiments are provided so that this disclosure will be more faithful and complete, and will fully convey the scope of the invention to those skilled in the art.

In the following drawings, the thickness and the size of each layer are exaggerated for convenience and clarity of description, and the same reference numerals designate the same elements in the drawings. As used herein, the term "and/or" includes any and all combinations of one or more of the listed items.

The terminology used herein is for the purpose of describing particular embodiments only and is not intended to limit the invention. As used herein, the singular forms "a," "an," and "the" include plural referents unless the context clearly dictates otherwise. Also, "comprise" and/or "comprising" when used herein should be interpreted as specifying the presence of stated shapes, numbers, steps, operations, elements, elements and/And does not preclude the presence or addition of one or more other features, integers, operations, elements, elements, and/or groups.

Figure 1B:
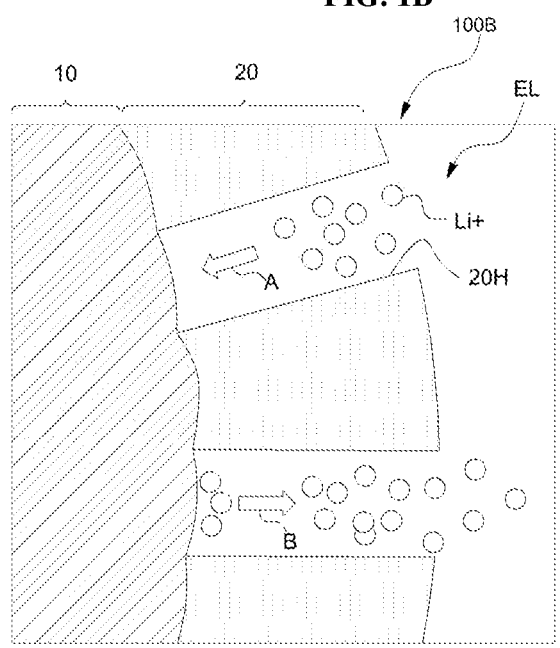

FIGS. 1A and 1B are cross-sectional views showing silicon anode active materials 100A and 100B, respectively according to an embodiment of the present invention.

Referring to FIG. 1A, the silicon anode active material 100A has a particle structure. The anode active material 100A having the particle structure may have an average particle diameter between 20 nm and 2 μm and the diameter of the particle structure may be appropriately selected depending on the application field and the electrode structure of the battery. For example, considering that the smaller the particle diameter, the less the change in volume during the charge/discharge of the battery and a deterioration of lifetime can be prevented, and the larger the particle diameter, the more energy density may be improved, the diameter may be selected.

The silicon anode active material 100A may include a silicon core 10. The silicon core 10 may be a single silicon particle or may have a secondary particle structure in which a plurality of silicon particles are aggregated together. The silicon particles may have a crystalline phase such as monocrystalline or polysilicon, amorphous or mixed phase thereof, and may be obtained by processes such as grinding, electrical explosion, or condensation of silicon precursor gases.

The silicon anode active material 100A may further include a clamping layer 20 on the silicon core 10. The clamping layer 20 may be a layer for mechanically relaxing the volume change of the silicon core 10 during charging and discharging of the battery and maintaining the particle shape of the active material itself. The clamping layer 20 may have a bilayer configuration comprising a silicon carbide layer 21 as an outer shell and a silicon oxide layer 22 as an inner shell between the silicon core 10 and the silicon carbide layer 21

Since the silicon oxide layer 22 of the clamping layer 20 functions as a source of silicon for formation of the silicon carbide layer 21 as described below with reference to FIG. 2, the silicon oxide layer 22 may be changed to have non-stoichiometric composition, $SiO_x$ ($0<X<2$) during formation of the silicon carbide 21, though the silicon oxide layer 22 has initially a stoichiometric composition. The silicon carbide layer (SiC) 21 formed from the silicon oxide layer 22 may have a crystalline, amorphous or mixed structure thereof. However, even in the case that the silicon carbide layer 21 has initially a crystalline structure, the silicon carbide layer may gradually become amorphous.

The thickness of the double clamping layer 20 may be between 0.5 nm and 20 nm. When the thickness of the double clamping layer 20 is more than 20 nm, the energy density of the entire silicon anode active material will be lowered. When the thickness is less than 0.5 nm, sufficient mechanical strength for alleviating the volume change of the silicon core 10 cannot be secured. Further, the performances of the silicon anode active material 100A can be optimized in view of its energy density and mechanical strength when the ratio of the thickness of the double clamping layer to the radius of the silicon core is within the range of 1% to 10%.

Referring to FIG. 1B, in some embodiments, the double clamping layer 20 of the silicon anode active material 100B may include one or two or more through holes 20H. The lithium ion $Li^+$ diffuses through the double clamping layer 20 or passes freely through the through holes 20H between the silicon core 10 and the electrolyte EL outside the double clamping layer 20. The lithium ion $Li^+$ dissolved in the electrolyte EL is transferred to the silicon core 10 inside the double clamping layer 20 through the through holes 20H of the double clamping layer 20 during charging of the battery, as shown arrow A and then the lithium ion $Li^+$ can be reduced. During discharging of the battery, as shown by the arrow B, the lithium ions $Li^+$ in the silicon core 10 are oxidized to be discharged from the silicon core 10. The lithium ion $Li^+$ passing freely through the through holes 20H compensates for the amount of lithium that has been reduced by the double clamping layer 20 to secure the charging and discharging efficiency and this property can be appropriately adjusted depending on the application of the battery is. For example, when a high voltage efficiency such as a notebook computer is required, the size of the entire silicon core can be reduced, the through holes 20H can be formed. In contrast, in a high-capacity application such as an electric vehicle, the formation of the holes 20H may be reduced or eliminated to maximize the mechanical clamping effect of the double clamping layer 20.

Figure 1C:
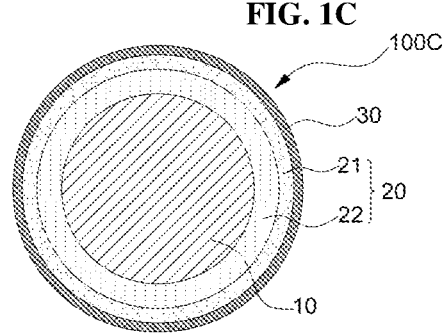
FIG. 1C is a cross-sectional view illustrating silicon anode active materials according to another embodiment of the present invention.

Referring to FIG. 1C, the silicon anode active material 100C may further include a carbon-based conductive layer 30 such as graphite, soft carbon, or graphene on the double clamping layer 20. The carbon-based conductive layer 30 may function for electrical connection between the silicon anode active materials 100B contacting each other and reduces the internal resistance from the silicon anode active materials 100B to the current collector (not shown). As described above, the carbon-based conductive layer 30 may be crystalline or at least partially an amorphous carbon film. When the carbon-based conductive layer 30 has a high crystallinity, it may be graphite, but in this case, it may cause a reaction with an electrolytic solution on the surface of the graphite. However, since the low-crystalline or amorphous carbon film has chemical resistance to the electrolyte, decomposition of the electrolyte may be suppressed during charging and discharging of the battery, so that the lifetime of an anode can be improved. In addition, the carbon-based conductive layer 30 may include an electrically conductive SP2 graphite structure and an insulating SP3 diamond structure. In order that the carbon-based conductive layer 30 has electrical conductivity, and the SP2 graphite structure may have a large mole fraction than that of the SP3 diamond structure, which can be controlled through a heat treatment process described below.

The above-described carbon-based conductive layer 30 is illustrative, and the present invention is not limited thereto. For example, another conductive layer such as nanoscale particles of conductive metal oxide, such as antimony zinc oxide or antimony tin oxide, or a layer thereof, may be formed on the double clamping layer 20. The nanoscale particles may form sintered bodies with the underlying silicon anode active material particles.

In some embodiments, the double clamping 20 of the silicon anode active material 100C may have a through-hole 20H, as described with reference to FIG. 1B, in which case the carbon-based conductive layer 30 may preferably continuously coat an entire surface of the silicon anode active material particle including the through hole 20H. In this case, it is possible to improve the mobility of the lithium ions through the through holes 20H and reduce the volume change of the silicon anode active material 100C by the double clamping layer 20, the silicon core 10 is prevented from being eroded by the carbon-based conductive layer 30 into the external electrolyte. The carbon-based conductive layer 30 is illustrative, and the nanoscale particle layer described above which functions as a suitable barrier layer for the electrolyte may be applied.

Figure 2:
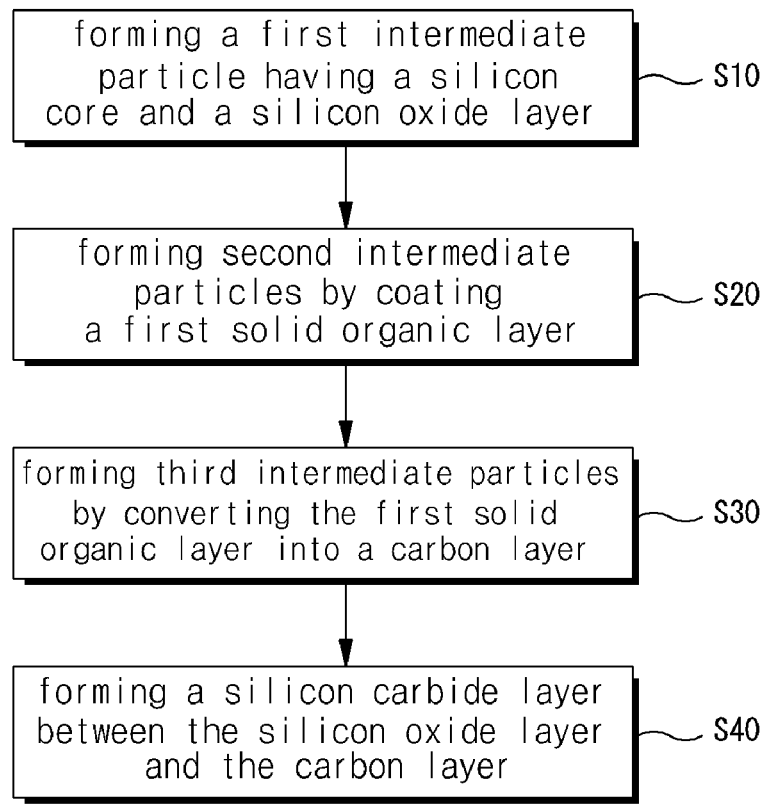
FIG. 2 is a flowchart showing a method of manufacturing a silicon anode active material according to an embodiment of the present invention.

FIG. 2 is a flow chart showing a method of fabricating a silicon anode active material according to an embodiment of the present invention, and FIGS. 3A to 3E show intermediate products according to the method of fabricating.

Figure 3A:
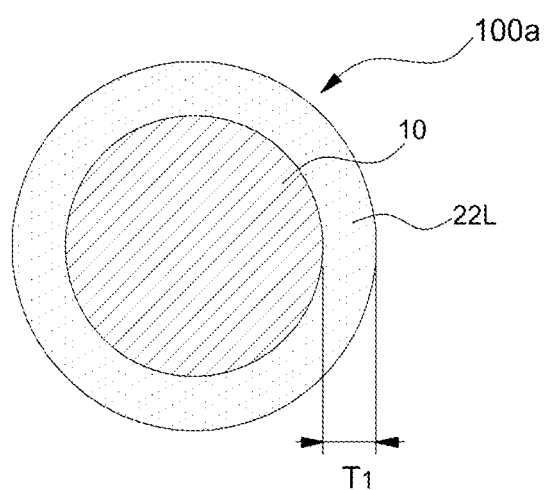
FIGS. 3A through 3E show intermediate products according to the above production method.

Referring to FIGS. 2 and 3A, a first intermediate particle 100a having a silicon core 10 and a silicon oxide layer 22L on a silicon core 10 may be formed (S10). The silicon oxide layer 22L may be a natural oxide film or a silicon oxide film formed artificially on the silicon core 10. For example, the artificially formed silicon oxide layer 22L may be provided by thermally oxidizing the surface of the silicon core 10 or by depositing silicon oxide on the silicon core 10 by chemical vapor deposition or plasma enhanced chemical vapor deposition As described below, since the silicon carbide layer 21 is formed while the silicon oxide layer 22L is consumed, the ratio of the silicon oxide layer 22L of the formed first intermediate particles 100a to the thickness of the final designed double clamping layer 20 (see FIG. 3D) is too small, the silicon oxide layer 22L may be entirely exhausted and then the double-clamping structure 20 may not be obtained. In other case, after the silicon oxide layer 22L is entirely exhausted, the internal silicon core 10 may be further consumed as a source of silicon, and then, the particle structure may be collapsed or a capacity of the resulting silicon anode active material decrease. Conversely, as the thickness $T_1$ of the silicon oxide layer 22L of the first intermediate particle 100a becomes greater, the thickness of the silicon oxide layer of the silicon anode active material (see reference numeral 22 in FIG. 1A) increases, decrease in the capacity of the silicon anode active material may occur. Since the density (for example, 2.3 g/cm$^3$) of the silicon oxide layer 22L is larger than the density (for example, 2.3 g/cm 3) of the carbon film, generally soft carbon film to be described later, the thickness of the silicon oxide layer 22L to be a silicon source for the silicon carbide layer of the double clamping layer 20 may be designed to have a sufficient margin by setting the thickness of the silicon oxide layer 22L to be within 50% and 150% to the thickness $T_{des}$ of the finally designed double clamping layer 20.

In addition, as will be described later, the thickness of the silicon oxide layer 22L may be designed to be about 1 to 10 times larger than the thickness of the carbon layer 25L, preferably about 1.1 to 3 times larger than the thickness of the carbon layer 25L to meet density variation of various carbon layers. This is because even if the carbon layer 25L is all consumed to form the silicon carbide layer 21, the underlying silicon oxide layer 21 can remain and the growth thickness of the double clamping layer 20 can be limited, thereby preventing the problem of an initial increase of an irreversible capacity of the anode material and transformation to be an inactive material, and the degradation of the rate performance due to the decrease of the mobility of Lithium.

Figure 3B:
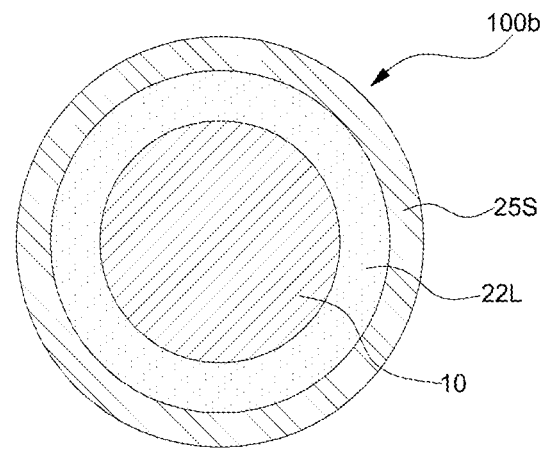
Figure 3C:
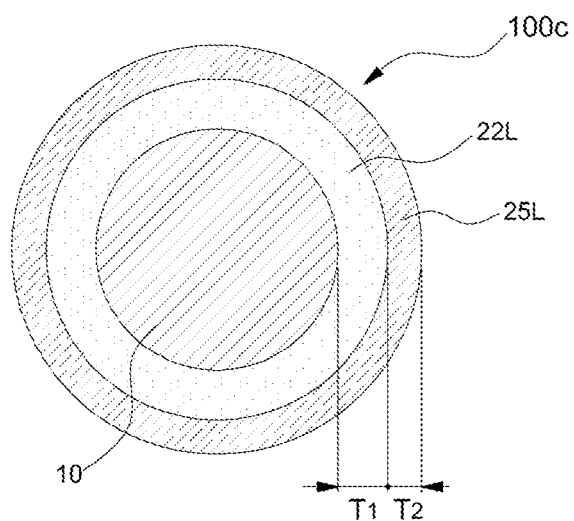

Referring to FIGS. 2 and 3B, a first solid organic layer 25S, which is a carbon precursor, may be coated on the first intermediate particles 100a to form second intermediate particles 100b (S20). In one embodiment, one or two or more mixed solutions selected from the group consisting of hydrocarbon-based, alcohol-based, ether-based, and ester-based compounds may be used as the carbon precursor for producing the first solid organic layer 25S. In one embodiment, the hydrocarbons may be hexene, nonene, dodecene, pentatetene, toluene, xylene, chlorobenzoic acid, benzene, hexadecyne, tetradecyne or octadecyne. However, this is illustrative and other liquid hydrocarbons of linear or branched type having a carbon number in the range of 6 to 20 can be utilized.

The alcohol may be at least one selected from the group consisting of ethyl alcohol, methyl alcohol, glycerol, propylene glycol, isopropyl alcohol, isobutyl alcohol, polyvinyl alcohol, cyclohexanol, octyl alcohol, decanol, hexatecanol, ethylene glycol, 1,2-octeine diol 1,2-dodecane diol, and 1,2-hexadecane diol, or a mixture thereof. Other primary alcohols, secondary alcohols and tertiary alcohols may be used as the alcohol-based organic solution.

The ether may be a cyclic ether such as octyl ether, butyl ether, hexyl ether, benzyl ether, phenyl ether, decyl ether, ethyl methyl ether, dimethyl ether, diethyl ether, diphenyl ether, tetrahydrofuran, and polyethers such as polyethylene glycol (PEG), polypropylene glycol (PPG), polytetramethylene glycol (PTMG), polyoxymethylene (POM), and polytetrahydrofuran. The aforementioned polyethers are only exemplary, and other aliphatic or aromatic polyethers may be used as the ether-based organic solvent. The ester may be selected from the group consisting of polyethylene terephthalate, acrylate esters and cellulose acetate, isobutyl acetate, isopropyl acetate, allyl hexanoate, benzyl acetate, bornyl acetate, butyl acetate and cyclic ester such as lactone.

In other embodiment, any or combination of carbon-containing natural and synthetic polymer material may be further used as an additional carbon precursor to increase the carbon-containing concentration, when using liquid organic compound as a solvent for the polymer materials. As another example, in place of the liquid organic compound, any one of carbon-containing natural and synthetic polymer materials or a mixture thereof may be dissolved in water such as another solvent, for example, distilled water or deionized water.

The carbon-containing polymeric material may be chitosan, glucose, sucrose, maltose, lactose, starch, glycogen, polystyrene (PS), polyethylene (PE), polypropylene (PP), polyvinyl chloride (PVC), polyacrylonitrile (PAN), polyethylene (PE), polyacrylic acid (PAA), polyvinylpyrrolidone (PVP), or a mixture thereof. For example, a polymer material such as PAN, PAA or PVP may be dissolved in a suitable solvent as the above described solvent, the first intermediate particles 100a may be dispersed in the solvent, and then first intermediate particles wetted with the polymer material may be obtained. The second intermediate particles 100b can be obtained by drying the resulting first intermediate particles.

The concentration of the dispersion solution of the first intermediate particle 100a and the solution which is the carbon precursor for forming the first solid organic layer 25S may be, for example, 0.1 wt % to 20 wt %. When the concentration of the dispersion solution is low, a yield may become low, and if the concentration is high, it is difficult to maintain the dispersion state, and therefore the wetting of the liquid organic compound may be difficult. In some embodiments, a stirring process may be performed to enhance a dispersibility of the dispersed particles. As another method, the organic solid film, which is a carbon precursor, can be coated on the first intermediate particles by a spray method or a scattering method, and the present invention is not limited.

In some embodiments, the mixed solution may further contain at least one compound selected from the group consisting of an amine surfactant such as octylamine, trioctylamine, decylamine, dodecylamine, tetradecylamine, hexadecylamine, oleylamine and/or other type surfactant such as octanoic acid, decanoic acid, lauric acid, hexadecanoic acid, oleic acid, erucic acid, stearic acid, benzoic acid or biphenylcarboxylic. This may improve the surface stability of the dispersed particles to help uniform wetting of the carbon precursor on the first intermediate particles. The above-mentioned surfactants are illustrative, and the present invention is not limited thereto. For example, the surfactant may be appropriately selected so as to control the shape of the dispersed particles such as spherical, nano-rods, tetrapods, and tripods by controlling the surface stability of the dispersed particles in the dispersion solution Referring to FIGS. 2 and 3C, the obtained second intermediate particles 100b may be heat-treated at a first temperature to convert the first solid organic layer 25S into a carbon layer 25L to form a third intermediate layer 100c in which the carbon layer 25L is formed on the silicon oxide layer 22L (S30). The first temperature may be selected within a temperature range in which only one solid organic layer 25L is selectively converted to the carbon layer 25L at a temperature below the temperature at which the silicon carbide layer is formed between the first solid organic layer 25S and the silicon oxide layer 22L. In one embodiment, the first temperature may be in the range of about 700° C. to about 1,100° C. At this time, the first solid organic layer 25S can be completely converted into the carbon layer 25L. The thickness T2 of the carbon layer 25L may be from 0.5 nm to 10 nm.

Figure 3D:
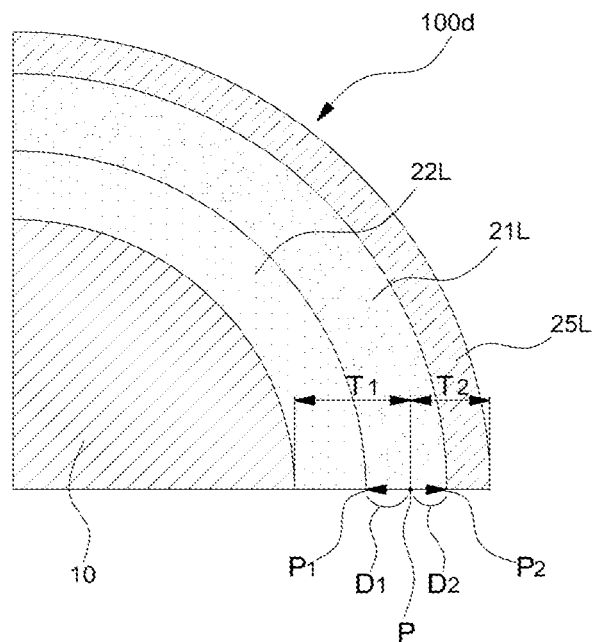

Referring to FIG. 2 and FIG. 3D, the third intermediate particle 100c may be heat-treated at a second temperature to form a silicon carbide layer 21 between the silicon oxide layer 22L and the carbon layer 25L. The second temperature may be higher than the first temperature. The second temperature may be in the range of 1,200° C. to 1,400° C.

In FIG. 3D, the position P is the interface position between the silicon oxide layer 22L and the carbon layer 25L before the heat treatment at the second temperature. As the heat treatment at the second temperature progresses, the surface of the silicon oxide layer 22L retreats to the position $P_1$, the thickness $T_1$ of the silicon oxide layer 22L decreases by value D1, and the inner surface of the carbon layer 25L may move forward to position $P_2$, so that the thickness $T_2$ of the carbon layer 25L may be reduced by value D2. As described above, the silicon oxide layer 22L and the carbon layer 25L are gradually reduced in thickness while consumed, and a silicon carbide layer 21L having a predetermined thickness may be formed between the silicon oxide layer 22L and the carbon layer 25L. The thickness ($T_{des}$) of the resulting double clamping layer may be smaller than the sum of the actually reduced thicknesses, D1+D2, due to the dense structure of the double clamping layer.

In some embodiments, the formation of the silicon carbide layer 21L may be terminated while the carbon layer 25L is exhausted. If the thickness $T_1$ of the silicon oxide layer 22L is 1 to 10 times larger than the thickness $T_2$ of the carbon layer 25L and preferably 1.1 to 3 times larger than the thickness $T_2$ of the carbon layer 25L, the silicon oxide layer 22L still remains after the end of the reaction due to the exhaustion of the carbon layer 25L, so that the double clamping film (20 of FIG. 1a) including formed silicon carbide layer 21L and the remaining silicon oxide layer 22L can be obtained. In another embodiment, the thickness $T_2$ of the carbon layer 25L may be sufficiently thick so that the carbon layer 25L that has not been converted to the silicon carbide layer 21 may remain on the double clamping layer 25L. The remaining carbon layer 25L may be used as a carbon-based conductive layer (30 in FIG. 1C) to provide a silicon anode active material 100d having a carbon-based conductive layer formed thereon.

Figure 3E:
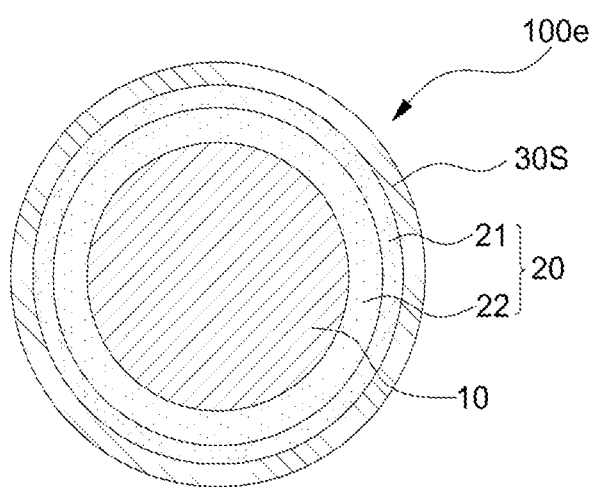

Referring to FIG. 2 and FIG. 3E, when the carbon layer 25L is exhausted, as described above, in order to form a conductive layer having excellent conductivity and easy physical property of lithium diffusion, a carbon-based conductive layer may be additionally formed. To this end, the second solid organic layer 30S may be coated on the double clamping layer 20 to form a fourth intermediate particles 100e.

The second solid organic layer 30S is formed by dissolving a carbon precursor material such as PAN, PAA, and PVP described above in a suitable solvent in the same manner as the first solid organic layer 25S, and dispersing the silicon active material particles in which the double clamping layer 20 is formed, obtaining the intermediate particles wetted with the polymer precursor material, and drying the resultant. The above-described embodiment is only illustrative and may be performed with reference to the above-described embodiment for forming the first solid organic layer.

Thereafter, the fourth intermediate particle 100e may be heat-treated at a third temperature to convert the second solid organic layer 26L into a carbon layer to form a silicon anode active material (see 100B in FIG. 1B) coated with a carbon-based conductive layer (see 30 in FIG. 1C). The third temperature may be in the range of 700° C. to 1,100° C., similar to the first temperature.

Figure 4:
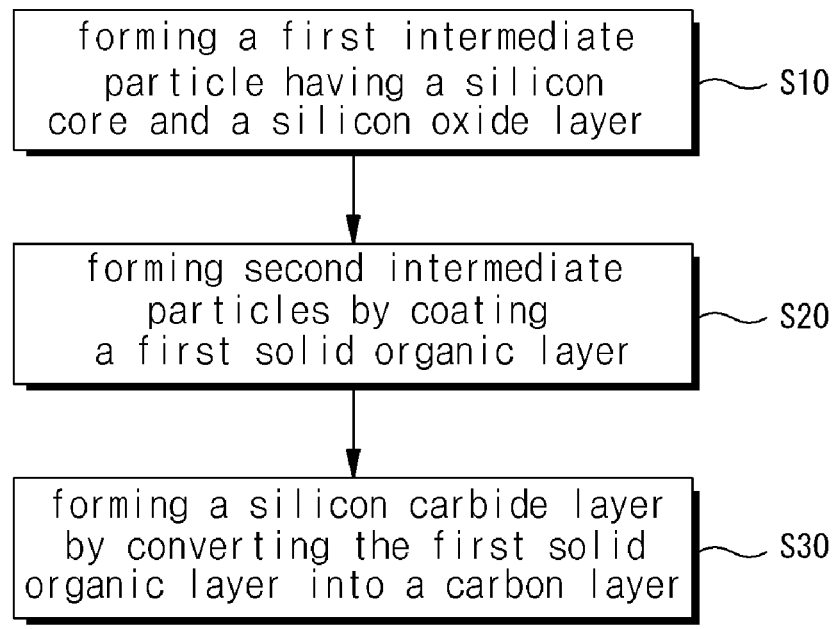
FIG. 4 is a flowchart showing a method of manufacturing a silicon anode active material according to another embodiment of the present invention.
Figure 5A:
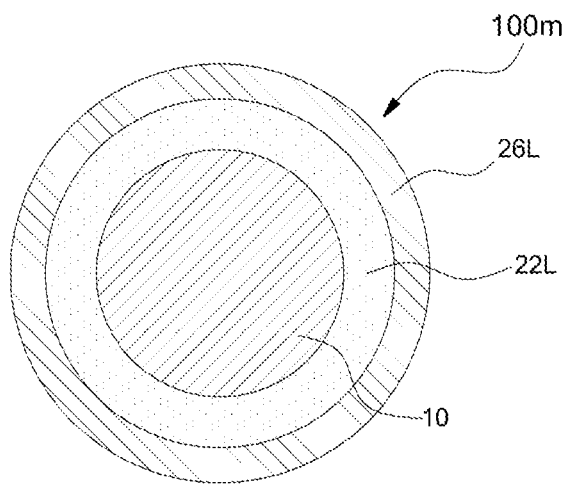
FIGS. 5A and 5B show intermediate products by the manufacturing method according to an embodiment of the present invention.
Figure 5B:
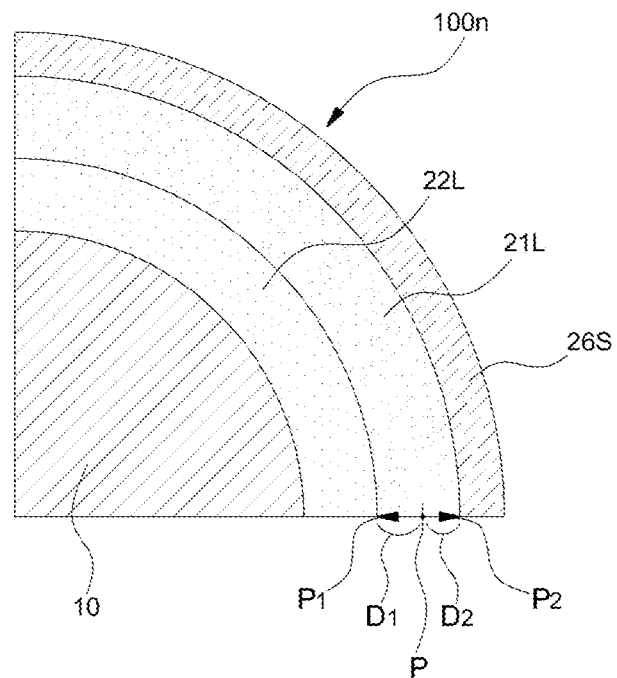

FIG. 4 is a flow chart showing a method of fabricating a silicon anode active material according to another embodiment of the present invention, and FIGS. 5A and 5B show intermediate products according to the fabricating method. Reference may be made to the foregoing disclosure for elements having the same reference numerals.

Referring to FIGS. 4 and 5A, first intermediate particles (see 100a in FIG. 3A) having a silicon core 10 and a silicon oxide layer 22 on the silicon core 10 may be formed (S10). As described above, the silicon oxide layer 22L may be a natural oxide film or an artificially formed layer on the silicon core 10. Since the silicon carbide layer is formed while the silicon oxide layer 22L is consumed, the thickness of the silicon oxide layer 22L is within the range of 50% to 150% of the thickness ($T_{des}$) of the final designed double clamping layer.

Thereafter, the first solid organic layer 26L is coated on the first intermediate particles to form second intermediate particles 100m (S20). As described above, the first solid organic layer 26L may be obtained by dispersing the first intermediate particles in a mixed solution of one or more selected from the group consisting of hydrocarbons based, alcohols based, ethers based, and esters based compound, and then drying the resulting first intermediated particles. In another embodiment, the liquid organic compound may be used as a solvent to increase the concentration of the carbon precursor by further adding any one or a mixture of the carbon-containing natural and synthetic polymer materials soluble therein. As another embodiment, it is also possible to dissolve any one or a mixture of carbon-containing natural and synthetic polymer materials in addition in another solvent, for example, water, and then mix the first intermediate particles (100 m) into the solvent, dispersing the first intermediate particles 100m in the mixed solution and then drying the resulting first intermediated particles to so that the first solid organic layer 26S may be coated on the first intermediated particles. These liquid phase methods have an advantage in that the first solid organic layer 26S can be uniformly coated on the first intermediate particles 100m on a large scale. In particular, when water is used as the solvent, there is an advantage that an environmentally friendly process can be established.

As another method, the organic solid film, which is a carbon precursor, may be coated on the first intermediate particles by a high-temperature spraying method or a scattering method, a suitable decompression or cooling process may be performed, and the present invention is not limited thereto Is not.

Referring to FIGS. 4 and 5B, the second intermediate particle 100m may be then heat-treated at a predetermined temperature to convert the first solid organic layer 26L into the carbon layer 26S, and at the same time, the silicon carbide layer 21L may be formed between the silicon oxide layer 22L and the first solid organic layers 26L (S30). The heat treatment temperature may be in the range of 1,150° C. to 1,300° C.

In some embodiments, the formation of the silicon carbide layer 21L may be terminated while the carbon layer 26S is exhausted. Since the thickness of the silicon oxide layer 22L is 1.5 to 3 times larger than the thickness of the carbon layer 26S, even if the carbon layer 26S is consumed as the silicon carbide layer 21L is formed, the double clamping layer (see reference numeral 20 of FIG. 1A) including the silicon carbide layer 21L and the silicon oxide layer 22L can be obtained since the silicon oxide layer 22L remains.

In another embodiment, if the thickness of the first solid organic layer 26L is sufficiently large, the silicon carbide layer 21L may be formed and the carbon layer 26S may not be exhausted, and the carbon layer may remain in the double clamping layer. In this case, the remaining carbon layer can be used as the carbon-based conductive layer Experimental Example 1

The carbon precursor PVP was dissolved in distilled water at room temperature, and the intermediate particles having the silicon oxide layer formed on the surface of the silicon core were dispersed in the PVP aqueous solution. The radius of the silicon core was 20 nm on average and the thickness of the silicon oxide layer was 2 nm. In order to form a sufficient amount of the solid organic layer, the concentration of PAN was increased to 10 wt %.

The dispersed aqueous solution was stirred for about 30 minutes to obtain silicon particles, and a solvent on the particles was evaporated to prepare the intermediate particles coated with a solid organic layer as a carbon precursor layer on the surface. Thereafter, the intermediate particles were heat-treated at 800° C. for 1 hour in an Ar gas atmosphere to prepare intermediate particles having a carbon layer formed thereon. Then, the intermediate particles having the carbon layer formed thereon were heat-treated at 1,200° C. for 1 hour in an Ar gas atmosphere. A silicon carbide layer was formed between the silicon oxide layer and the carbon layer of the intermediate particles by the heat treatment, so that the double clamping film was formed on the silicon particles.

Experimental Example 2

As in Experimental Example 1, PVP as a carbon precursor was dissolved in distilled water at room temperature, and silicon particles having a silicon oxide layer formed on the surface of the silicon core were dispersed in the PVP aqueous solution. The silicon particles are the same as the silicon particles of Experimental Example 1, the average radius of the silicon core is 20 nm, and the thickness of the silicon oxide layer is about 2 nm.

After the dispersion aqueous solution was stirred for about 30 minutes, silicon particles were obtained and the solvent on the particle was evaporated to prepare the intermediate particles having a carbon precursor layer coated on the surface thereof as a solid organic layer. Thereafter, the intermediate particles were heat-treated at 1,200° C. for 2 hours in an Ar gas atmosphere to form a silicon carbide layer and a carbon layer sequentially on the silicon oxide layer of the intermediate particles.

Figure 6:
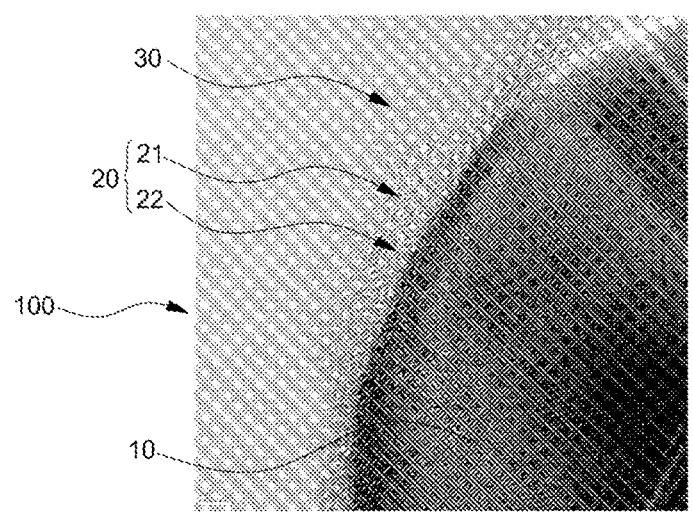
FIG. 6 is a high-resolution transmission electron microscope (HR-TEM) image of the silicon anode active material particles produced by the above experimental examples.
Figure 7:
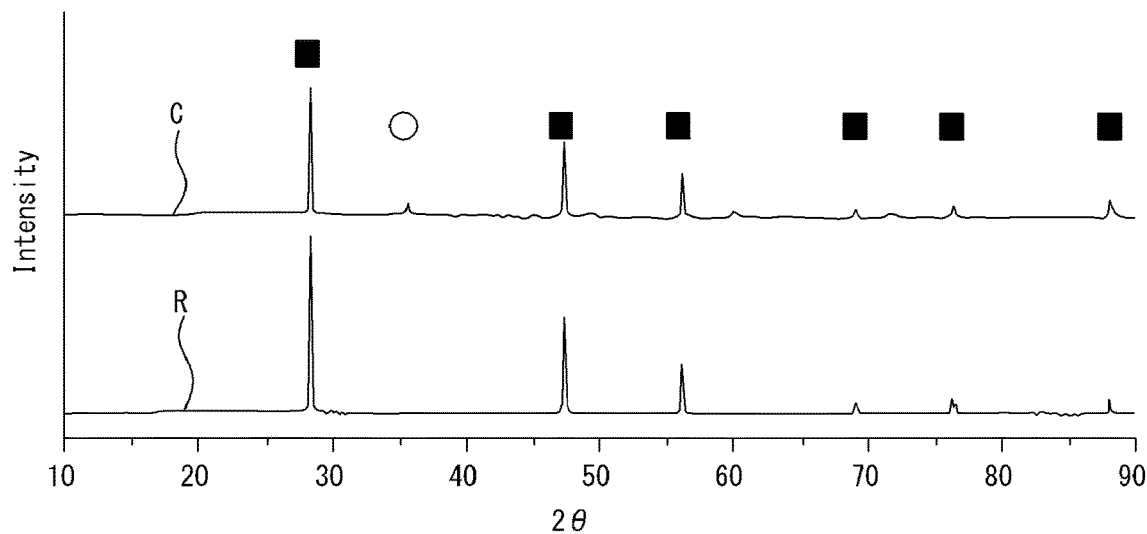
FIG. 7 is an X-ray diffraction pattern of a silicon anode active material according to an embodiment of the present invention.

FIG. 6 is a high-resolution transmission electron microscope (HR-TEM) image of the silicon anode active material particle 100 produced by the above experimental examples. The radius of the silicon core 10 is 20 nm on average, which is equal to the radius of the silicon core prior to the formation of the double clamping layer 20, which indicates that the silicon core was not eroded during the formation of the double clamping layer 20. The total thickness of the double clamping layer 20 formed on the silicon core 10 was 2.3 nm and the carbon layer 30 still remained after the silicon carbide layer 21 was formed FIG. 7 is an X-ray diffraction pattern of a silicon anode active material according to an embodiment of the present invention. □ is the peak of the silicon core, and • is the peak of the silicon carbide. Curve C is the measurement result of the silicon anode active material particle having the double clamping layer according to the embodiment of the present invention, and the curve R is the peak of the silicon core.

Table 1 below shows the average electrode expansion ratio of the negative electrode to which the silicon anode active material according to Experimental Examples 1 and 2 was applied and the average electrode expansion ratio of the negative electrode to which the silicon negative active material was applied according to the comparative example.

TABLE 1

| Average Electrode Expansion Ratio | Examples 1 and 2 | Comparative Example |
|---|---|---|
| A* | 102% | 189% |
| B** | 42% | 108% |

*A = (thickness at charging − initial thickness)/thickness at charging × 100
**B = (Thickness at charging − Thickness at discharge)/Thickness at charging × 100

As shown in Table 1, according to the embodiment (curve C), the change in thickness during the charging is suppressed to about 2% based on the initial thickness, and the change in thickness during charging and discharging may be suppressed to 42% or less based on the charging time. However, the silicon anode active material according to the comparative example (curve R) exhibited a change in the thickness at the time of charging to about 189% based on the initial thickness, and the change in thickness at the time of charging and discharging showed a change of more than 108% at discharging.

Figure 8A:
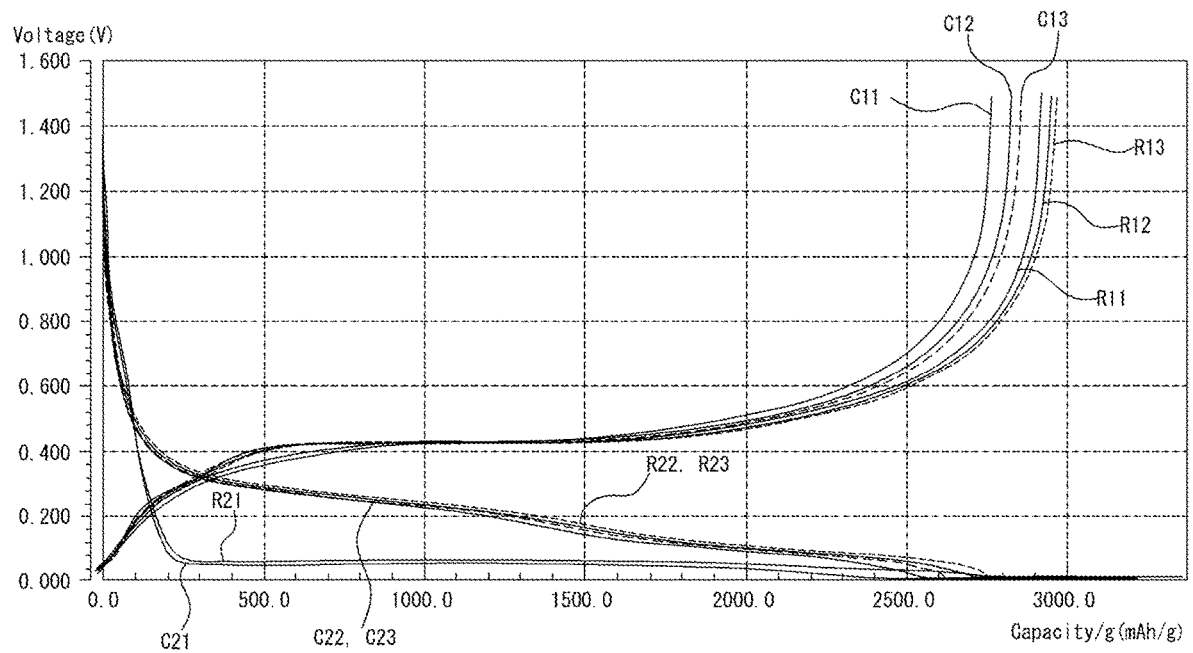
FIG. 8A is a graph showing initial charging/discharging characteristics of half-cells manufactured using the silicon active material particles of Experimental Example 1 and the silicon active material particles of the comparative example.
Figure 8B:
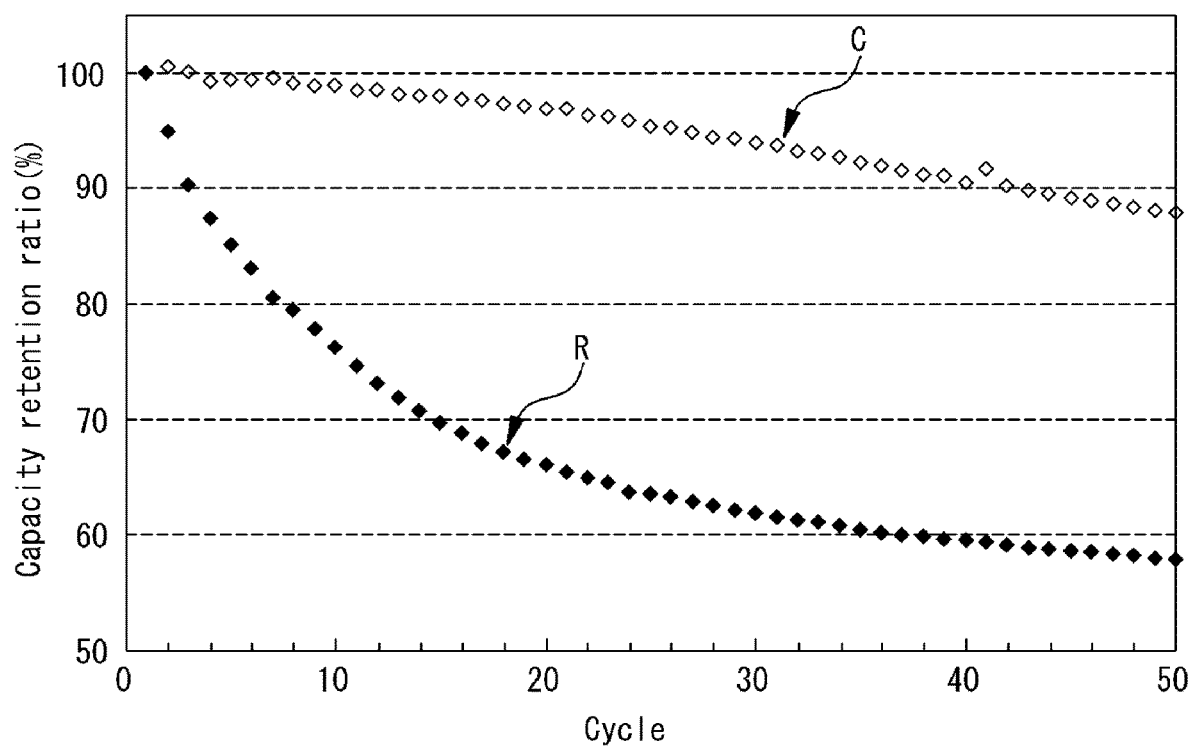
FIG. 8B is a graph showing capacity retention ratios of the half-cells.

FIG. 8A is a graph showing initial charging/discharging characteristics of half-cells manufactured using the silicon active material particles of Experimental Example 1 and the silicon active material particles of the comparative example, and FIG. 8B is a graph showing capacity retention ratios of the half-cells. The comparative example is obtained by forming a carbon layer on a silicon core. The charge/discharge rate is 0.1 C.

In FIG. 8A, the curves C11, C12 and C13 show the charging characteristics of once, twice and three times in Experimental Example 1, and the curves C21, C22 and C23 show the discharging characteristics of the discharging characteristics of Example 1. Likewise, the curves R11, R12 and R13 show the charging characteristics of once, twice and three times of the comparative example, and the curves R21, R22 and R23 show the discharge characteristics of once, twice and three times of the comparative example. It can be confirmed that the charging capacity in both Experimental Example 1 and Comparative Example is not less than 2,700 (mAh/h). The initial charge capacity tends to increase slightly in the second and third cycles, but gradually converges. The silicon active material of the comparative example has an initial charging capacity a little greater than that of experimental example 1. However, referring to the discharge characteristics, both the experimental example 1 and the comparative example exhibit substantially the same behavior. However, from the second time, the discharge efficiency is somewhat reduced, which can be attributed to the increase of the irreversible capacity due to the volume change due to charging and discharging.

Referring to FIG. 8B, the capacity of the battery (curve C) of Example 1 is maintained at 90% or more even at 40 cycles, while the battery (curve R) of the comparative example decreases from 40 cycles to 60% or less. The battery of Example 1 and the battery of Comparative Example exhibited relatively similar behavior in terms of charge and discharge capacity characteristics as shown in FIG. 8A, but in view of the capacity retention rate related to the life characteristic, the battery of Example 1 was remarkably improved by the double clamping film according to the embodiment of the present invention.

It will be apparent to those skilled in the art that various modifications and variations can be made in the present invention without departing from the spirit or scope of the invention as defined in the appended claims. It will be clear to those who have knowledge.

The invention claimed is:
1. A silicon anode active material comprising particles, wherein the particles each comprise:
   a single silicon core; and
   a double clamping layer having a silicon carbide layer on the silicon core and a silicon oxide layer between the silicon core and the silicon carbide layer,
   wherein the thickness of the double clamping layer is 0.5 nm to 20 nm.
2. The silicon anode active material of claim 1, wherein the silicon oxide layer is a silicon source of the silicon carbide layer.
3. The silicon anode active material of claim 1, wherein the ratio of the thickness of the double clamping layer to the radius of the silicon core is in the range of 0.1% to 10%.
4. The silicon anode active material of claim 1, further comprising a conductive layer formed on the double clamping layer.
5. The silicon anode active material of claim 4, wherein the double clamping layer includes through holes, and the conductive layer is continuously coated on the silicon anode active material through the through holes.
6. The silicon anode active material of claim 4, wherein the conductive layer comprises a carbon-based conductive layer.
7. A method of fabricating a silicon anode active material, the method comprising:
   forming a first intermediate particle having a silicon core and a silicon oxide layer on the silicon core;
   coating a first solid organic layer on the first intermediate particles to form second intermediate particles;
   heat treating the second intermediate particles at a first temperature to convert the first solid organic layer into a carbon layer thereby forming third intermediate particles; and
   heat treating the third intermediate particles at a second temperature to form a silicon carbide layer between the silicon oxide layer and the carbon layer to form a double clamping layer comprising the silicon oxide layer and the silicon carbide layer, wherein the thickness of the double clamping layer is 0.5 nm to 20 nm.
8. The method of claim 7, wherein the silicon oxide layer is a silicon source of the silicon carbide layer.
9. The method of claim 7, wherein the first temperature is in the range of 700° C. to 1,100° C.
10. The method of claim 7, wherein the second temperature is in the range of 1,150° C. to 1,300° C.
11. The method of claim 7, wherein the thickness of the silicon oxide layer of the first intermediate particles is in a range of 50% to 150% of the thickness of the double clamping layer.
12. The method of claim 7, wherein the thickness of the silicon oxide layer of the third intermediate particle ranges from 1 to 10 times the thickness of the carbon layer.
13. The method of claim 7, wherein the ratio of the thickness of the double clamping layer to the radius of the silicon core is in the range of 0.1% to 10%.
14. The method of claim 7, wherein the forming of the second intermediate particles comprises:
   preparing a dispersion solution containing a carbon precursor;
   dispersing the first intermediate particles in the dispersion solution; and
   obtaining and drying the first intermediate particles with the dispersed solution wetted thereon.
15. The method of claim 14, wherein the carbon precursor may be at least one selected from the group consisting of hydrocarbons based solution, alcohols based solution, ethers based solution, and esters based solution; or a carbon-containing natural polymer material and the carbon-containing synthetic polymer material dissolved in the solution or water, or a mixture thereof.
16. The method of claim 15, wherein the carbon-containing polymer material comprises chitosan, glucose, sucrose, maltose, lactose, starch, glycogen, polystylene (PS), polyethylene (PE), polypropylene (PP), polyvinyl chloride (PVC), polyacrylonitrile (PAN), polyethylene (PE), polyacrylonitrile Polyacrylic acid (PAA), polyvinylpyrrolidone (PVP), or a mixture thereof.
17. A method of fabricating silicon anode material, the method comprising:
   forming a first intermediate particle having a silicon core and a silicon oxide layer on the silicon core;
   coating a first solid organic layer on the first intermediate particles to form second intermediate particles; and
   heat treating the second intermediate particles to convert the first solid organic layer into a carbon layer and simultaneously forming a silicon carbide layer between the silicon oxide layer and the first solid organic layer to form a double clamping layer comprising the silicon oxide layer and the silicon carbide layer, wherein the thickness of the double clamping layer is 0.5 nm to 20 nm.
18. The method of claim 17, wherein the silicon oxide layer is a silicon source of the silicon carbide layer.
19. The method of claim 17, wherein the heat treatment temperature is in a range of 1,150° C. to 1,300° C.
20. The method of claim 17, wherein the thickness of the silicon oxide layer of the first intermediate particles is within a range of 50% to 150% of the thickness of the double clamping layer.

21. The method of claim 17, wherein the ratio of the thickness of the double clamping layer to the radius of the silicon core is in the range of 0.1% to 10%.

22. The method of claim 17, wherein the forming of the second intermediate particles comprises:
   preparing a dispersion solution comprising a carbon precursor;
   dispersing the first intermediate particles in the dispersion solution; and
   obtaining and drying the first intermediate particles with the dispersed solution wetted thereon.

23. The method of claim 22, wherein the carbon precursor may be at least one selected from the group consisting of hydrocarbons based solution, alcohols based solution, ethers based solution, and esters based solution; or a carbon-containing natural polymer material and the carbon-containing synthetic polymer material dissolved in the solution or water, or a mixture thereof.

24. The method of claim 23, wherein the carbon-containing polymeric material may be selected from the group consisting of chitosan, glucose, sucrose, maltose, lactose, starch, glycogen, polystyrene (PS), polyethylene (PE), polypropylene (PP), polyvinyl chloride (PVC), polyacrylonitrile (PAN), Polyethylene (PE), polyacrylic acid (PAA), polyvinyl pyrrolidone (PVP), or a mixture thereof.

* * * * *